United States Patent
Robinson et al.

(10) Patent No.: US 11,673,507 B2
(45) Date of Patent: Jun. 13, 2023

(54) VEHICLE TAILGATE WITH INTEGRATED STEP

(71) Applicant: Rivian IP Holdings, LLC, Plymouth, MI (US)

(72) Inventors: William Kirk Robinson, Ann Arbor, MI (US); Mason Verbridge, Livonia, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 253 days.

(21) Appl. No.: 16/915,000

(22) Filed: Jun. 29, 2020

(65) Prior Publication Data
US 2021/0402929 A1 Dec. 30, 2021

(51) Int. Cl.
*B60R 3/02* (2006.01)
*B62D 33/027* (2006.01)

(52) U.S. Cl.
CPC ............ *B60R 3/02* (2013.01); *B62D 33/0273* (2013.01)

(58) Field of Classification Search
CPC ............................... B60R 3/02; B62D 33/0273
See application file for complete search history.

(56) References Cited

U.S. PATENT DOCUMENTS

| | | | |
|---|---|---|---|
| 6,905,157 B2* | 6/2005 | Kang | B62D 33/0273 296/57.1 |
| 7,234,750 B1* | 6/2007 | Doolittle | B60R 3/02 296/57.1 |
| 8,201,869 B1* | 6/2012 | Butlin, Jr. | B60R 3/02 296/57.1 |
| 9,463,746 B2* | 10/2016 | Butlin, Jr. | B62D 33/03 |
| 9,902,328 B1* | 2/2018 | Mazur | B60R 3/02 |
| 9,988,103 B1* | 6/2018 | Mouch | B62D 33/0273 |
| 9,994,263 B1* | 6/2018 | Richter | B60P 1/435 |
| 10,661,842 B2* | 5/2020 | Povinelli | B60Q 1/2661 |
| 10,994,660 B2* | 5/2021 | Ngo | B62D 33/0273 |
| 11,214,318 B1* | 1/2022 | Parker | B60J 5/12 |
| 11,242,097 B1* | 2/2022 | Gross, IV | H04R 5/02 |
| 2007/0075560 A1* | 4/2007 | Katterloher | B60R 3/02 296/50 |

(Continued)

FOREIGN PATENT DOCUMENTS

DE 102021114674 A1 * 12/2021 ............... B60R 3/02
DE 102021115039 A1 * 12/2021 ......... B62D 33/0273

(Continued)

*Primary Examiner* — Jacob B Meyer
(74) *Attorney, Agent, or Firm* — Clements Bernard Walker; Christopher L. Bernard

(57) ABSTRACT

A tailgate for a vehicle includes a main panel, a step, and a plurality of links that couple the step to the main panel and support the step for movement relative to the main panel between a stowed position and a deployed position. The main panel defines a cutout open through its rearward side. The main panel is mounted to the vehicle's cargo area and movable between a closed position and an open position. The step includes a cargo side and a rearward side. When the step is in the stowed position, the step is received in the cutout and the step's cargo side is substantially parallel to the main panel's cargo side. When the step is in the deployed position, the step is offset from the main panel and the step's cargo side is substantially parallel to the main panel's cargo side.

19 Claims, 5 Drawing Sheets

(56) References Cited

U.S. PATENT DOCUMENTS

| | | | | |
|---|---|---|---|---|
| 2012/0126564 | A1* | 5/2012 | Hausler | B62D 33/0273 |
| | | | | 296/57.1 |
| 2016/0075286 | A1* | 3/2016 | Butlin, Jr. | B62D 33/03 |
| | | | | 296/50 |
| 2016/0311355 | A1* | 10/2016 | Krajenke | B62D 33/0273 |
| 2017/0274940 | A1* | 9/2017 | Povinelli | B62D 33/0273 |
| 2017/0291551 | A1* | 10/2017 | Krajenke | B62D 33/0273 |
| 2017/0320419 | A1* | 11/2017 | Gobart | B60N 3/02 |
| 2019/0054961 | A1* | 2/2019 | Ngo | B60R 3/02 |
| 2021/0039722 | A1* | 2/2021 | Williamson | B62D 33/03 |
| 2021/0155296 | A1* | 5/2021 | Povinelli | B60R 7/005 |
| 2021/0221448 | A1* | 7/2021 | Hung | B62D 33/0273 |
| 2021/0380175 | A1* | 12/2021 | Jarjoura | B60R 3/02 |
| 2021/0387680 | A1* | 12/2021 | Parker | B62D 33/0273 |
| 2021/0402929 | A1* | 12/2021 | Robinson | B62D 33/0273 |
| 2021/0403097 | A1* | 12/2021 | Gase | E05F 15/605 |
| 2022/0097608 | A1* | 3/2022 | Patterson | B62D 33/0273 |
| 2022/0119046 | A1* | 4/2022 | Parker | B62D 33/0273 |

FOREIGN PATENT DOCUMENTS

| | | | | |
|---|---|---|---|---|
| WO | WO-2016028884 A1 * | 2/2016 | | B60P 1/26 |
| WO | WO-2021243472 A1 * | 12/2021 | | |

* cited by examiner

VEHICLE TAILGATE WITH INTEGRATED STEP

FIELD

The present disclosure relates generally to a vehicle tailgate having an integrated step.

BACKGROUND

The statements in this section merely provide background information related to the present disclosure and may not constitute prior art.

Vehicles such as pickup trucks can have drop-down tailgates that provide access to a rear cargo bed. Typical tailgates are attached to the rear of the vehicle body so that the tailgate is movable relative to the body between a closed position and an open position. In the closed position, the tailgate blocks the rear tailgate opening and is generally perpendicular to the floor of the cargo bed. In the open position, the tailgate is generally parallel with the floor of the cargo bed. However, the floor of the cargo bed and the tailgate in the open position are typically relatively high off of the ground in order to provide adequate ground clearance for the vehicle. For some people, it can be difficult to climb into or out of the cargo bed due to the height of the open tailgate. Additionally, it can be beneficial to reduce the amount of weight of the vehicle to increase power source efficiency (e.g., increased fuel efficiency or battery range).

Accordingly, these issues with ingress and egress from typical tailgates are addressed by the present disclosure.

SUMMARY

In one form, a tailgate for a vehicle includes a main panel, a step, and a plurality of links. The main panel includes a first cargo side and a first rearward side and defines a cutout open through the first rearward side. The main panel is adapted to be mounted to a cargo area of the vehicle and movable relative to the cargo area between a closed position and an open position. When the main panel is in the closed position, the first cargo side faces toward the cargo area and the first rearward side faces away from the cargo area. The step includes a second cargo side and a second rearward side. The plurality of links couple the step to the main panel and support the step for movement relative to the main panel between a stowed position and a deployed position. When the step is in the stowed position, the step is received in the cutout and the second cargo side is substantially parallel to the first cargo side. When the step is in the deployed position, the step is offset from the main panel and the second cargo side is substantially parallel to the first cargo side.

According to a further form, the plurality of links includes a first link, a second link, a third link, and a fourth link. The first and second links couple a left side of the step to the main panel. The third and fourth links couple a right side of the step to the main panel.

According to a further form, the first, second, third, and fourth links are mounted to the main panel within the cutout.

According to a further form, when the main panel is in the closed position and the step is in the stowed position, the first, second, third, and fourth links are mounted to the main panel proximate to a top of the main panel and mounted to the step proximate to a bottom of the step.

According to a further form, the cut-out is open through the first cargo side.

According to a further form, when the step is in the stowed position, a portion of the step overlaps with a portion of the first cargo side.

According to a further form, when the step is in the stowed position a portion of the step overlaps with a portion of the first rearward side.

According to a further form, the tailgate further includes a first latch configured to inhibit movement of the step from the stowed position to the deployed position.

According to a further form, the tailgate further includes a second latch configured to inhibit movement of the step from the stowed position to the deployed position.

According to a further form, the first latch is located on a left side of the step and the second latch is located on a right side of the step.

According to a further form, the tailgate further includes a stop member configured to engage one of the step and the plurality of links to inhibit movement of the step relative to the main panel when the step is in the deployed position.

According to a further form, the tailgate further includes a resilient member coupled to one of the step or the plurality of links and configured to bias the step toward the stowed position or the deployed position.

According to a further form, the linkage is configured to move the step between the stowed position and the deployed position while maintaining the second cargo side substantially parallel to the first cargo side.

According to a further form, the plurality of links form a scissor mechanism.

In another form, a tailgate for a vehicle includes a main panel, a step, and a plurality of links. The main panel includes a first cargo side and a first rearward side and defines a cutout open through the first rearward side. The main panel is adapted to be mounted to a cargo area of the vehicle and movable relative to the cargo area between a closed position and an open position. When the main panel is in the closed position, the first cargo side faces toward the cargo area and the first rearward side faces away from the cargo area. The step includes a second cargo side and a second rearward side. The plurality of links include a first link, a second link, a third link, and a fourth link. The plurality of links couple the step to the main panel and support the step for movement relative to the main panel between a stowed position and a deployed position. When the step is in the stowed position, the step is received in the cutout and the second cargo side is substantially parallel to the first cargo side. When the step is in the deployed position, the step is offset from the main panel and the second cargo side is substantially parallel to the first cargo side. One end of the first link and one end of the second link mounted proximate to a left side of the step. Another end of the first link and another end of the second link are mounted to the main panel. One end of the third link and one end of the fourth link are mounted proximate to a right side of the step. Another end of the third link and another end of the fourth link are mounted to the main panel.

According to a further form, the tailgate further includes a stop member configured to engage one of the step and the plurality of links to inhibit movement of the step relative to the main panel when the step is in the deployed position.

According to a further form, the tailgate further includes a first latch and a second latch that are configured to inhibit movement of the step from the stowed position to the deployed position. The first latch engages the left side of the step with the main panel. The second latch engages the right side of the step with the main panel.

According to a further form, the tailgate further includes a resilient member coupled to one of the step or the plurality of links and configured to bias the step toward the stowed position or the deployed position.

In another form, a vehicle includes a vehicle body, a tailgate panel, a step, a plurality of links, a latch, and a stop member. The vehicle body defines a cargo area. The tailgate panel is pivotally coupled to the vehicle body for movement relative to the vehicle body between a closed position and an open position. The tailgate panel includes a first cargo side and a first rearward side. The tailgate panel defines a cutout open through the first rearward side. When the tailgate panel is in the closed position, the first cargo side faces into the cargo area and the first rearward side faces away from the cargo area. The step includes a second cargo side and a second rearward side. The plurality of links includes a first link, a second link, a third link, and a fourth link. The plurality of links couple the step to the tailgate panel and support the step for movement relative to the tailgate panel between a stowed position and a deployed position. When the step is in the stowed position, the step is received in the cutout and the second cargo side is substantially parallel to the first cargo side. When the step is in the deployed position, the step is offset from the tailgate panel and the second cargo side is substantially parallel to the first cargo side. One end of the first link and one end of the second link are mounted to the step proximate to a left side of the step. Another end of the first link and another end of the second link are mounted to the tailgate panel. One end of the third link and one end of the fourth link are mounted to the step proximate to a right side of the step. Another end of the third link and another end of the fourth link are mounted to the tailgate panel. The latch is operable in a first mode in which the step is movable relative to the tailgate panel and a second mode in which the latch inhibits movement of the step relative to the tailgate panel. The stop member is configured to engage one of the step and the plurality of links to inhibit movement of the step relative to the tailgate panel when the step is in the deployed position.

According to a further form, the vehicle further includes a resilient member coupled to one of the step or the plurality of links and configured to bias the step toward the stowed position or the deployed position.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
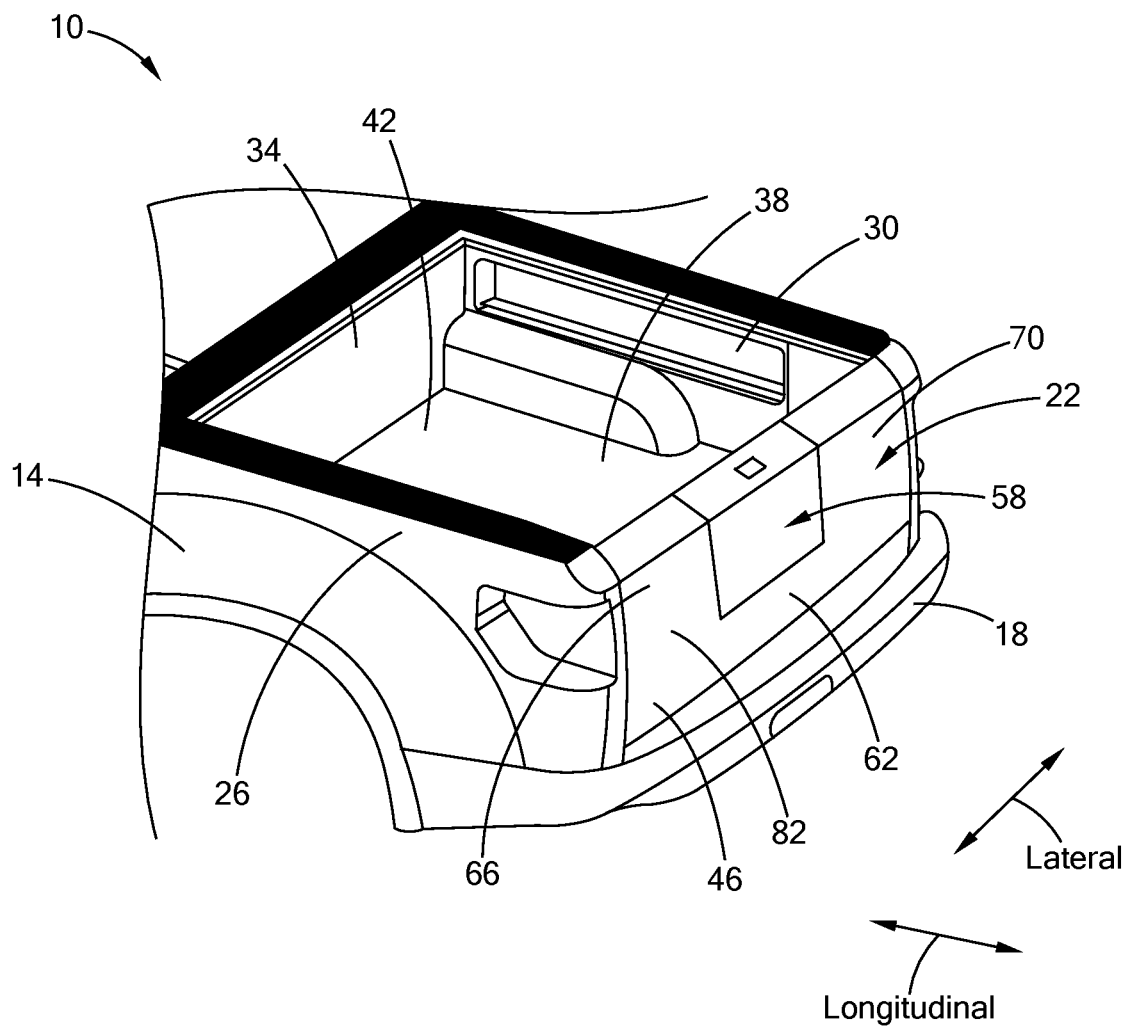
FIG. 1 is a perspective view of a cargo bed and tailgate of a vehicle in accordance with the teachings of the present disclosure, illustrating the tailgate in a closed position.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
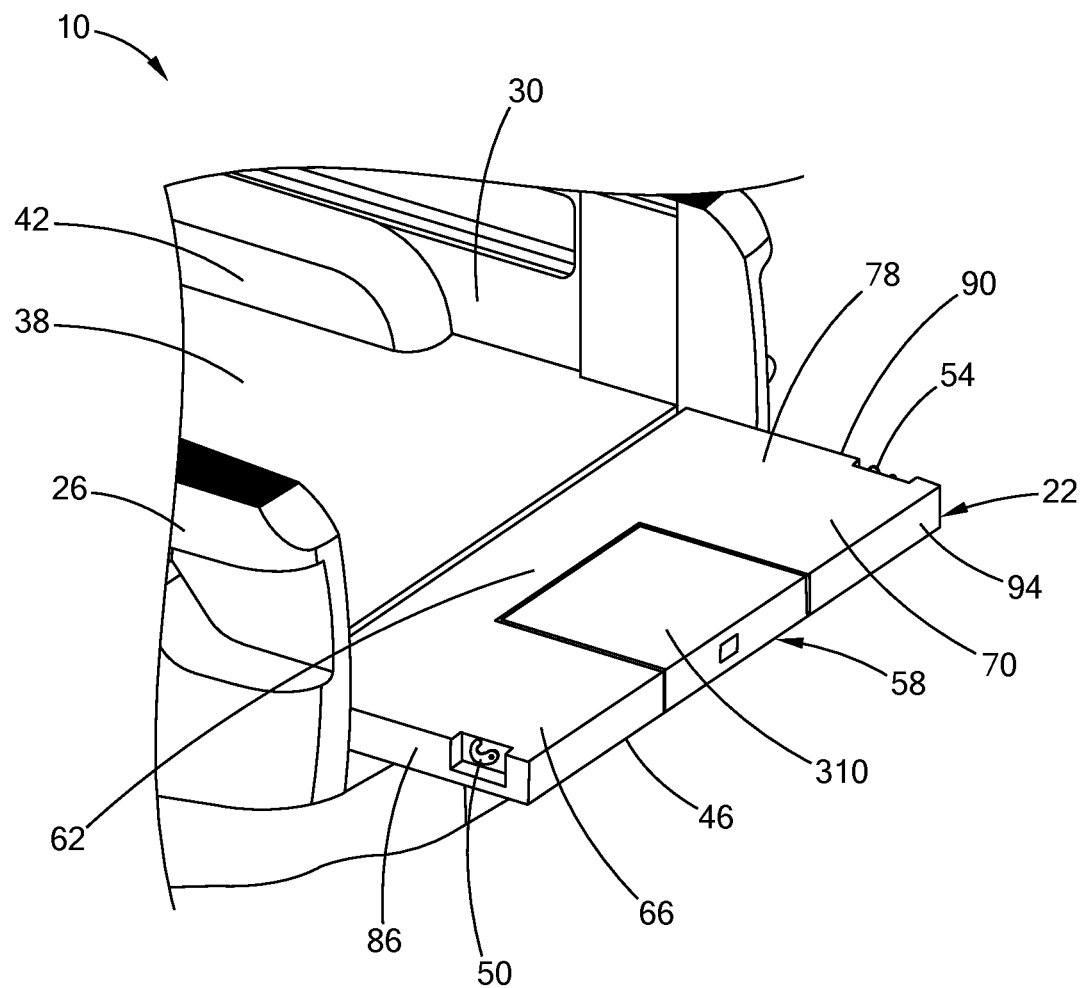
FIG. 2 is a perspective view similar to FIG. 1, illustrating the tailgate in an open position, with a step of the tailgate in a stowed position.

With reference to FIGS. 1 and 2, a rear portion of a vehicle 10 is illustrated. In the example provided, the vehicle 10 is a pickup truck, though other configurations can be used. The vehicle 10 includes a vehicle body 14, a rear bumper 18, and a tailgate 22. The vehicle body 14 includes a left bed wall 26, a right bed wall 30, a forward bed wall 34, and a bed floor 38 that cooperate to define a cargo bed 42. In the example provided, the top of the cargo bed 42 is open, though other configurations can be used, such as where a tonnaeu cover or truck bed cap are used.

The tailgate 22 includes a tailgate panel 46, a left tailgate latch 50, a right tailgate latch 54, and a step assembly 58. The tailgate panel 46 is a generally "U" shaped body. The "U" shape of the tailgate panel 46 is defined by a bottom portion 62, a left portion 66, and a right portion 70. The bottom portion 62 spans between the left and right bed walls 26, 30. When the tailgate panel 46 is in a closed position (shown in FIG. 1), the left portion 66 extends upwards from the left side of the bottom portion 62. When the tailgate panel 46 is in the closed position (shown in FIG. 1), the right portion 70 extends upwards from the right side of the bottom portion 62. The left and right portions 66, 70 are spaced apart from each other in the lateral direction of the vehicle 10 to define a cutout or step cavity 74 (shown in FIG. 3) bounded by a left side of the right portion 70, a top side of the bottom portion 62, and a right side of the left portion 66.

The bottom portion 62, the left portion 66, and the right portion 70 are generally in the same plane, though not necessarily flat or smooth so that the bottom portion 62, the left portion 66, and the right portion 70 generally form a cargo side 78 (facing forward into the cargo bed 42 when the tailgate panel 46 is in the closed position, shown in FIG. 1) and a rearward side 82 (facing rearward away from the cargo bed 42 when the tailgate panel 46 is in the closed position, shown in FIG. 1) of the tailgate panel 46. Likewise, the bottom portion 62 and left portion 66 generally form a left side 86 of the tailgate panel 46 that faces toward the left bed wall 26, while the bottom portion 62 and the right portion 70 generally form a right side 90 of the tailgate panel 46 that faces toward the right bed wall 30. The left and right portions 66, 70 form a top side 94 of the tailgate panel 46 that is generally aligned with a top of the left and right bed walls 26, 30 when the tailgate panel 46 is in the closed position (FIG. 1).

The tailgate panel 46 is attached to the vehicle body 14 proximate to the rear of the vehicle 10 and above the bumper 18 in a manner that permits the tailgate 22 to pivot relative to the vehicle body 14 about an axis that extends in the lateral direction of the vehicle 10. In the example provided, the bottom portion 62 is attached to the left bed wall 26 at the left side 86 of the tailgate panel 46 and the bottom portion 62 is attached to the right bed wall 30 at the right side 90 of the tailgate panel 46. The tailgate panel 46 is coupled to the left and right bed walls 26, 30 to pivot between the closed position (shown in FIG. 1) and an open position (shown in FIG. 2), such as with pivot joints (not shown) attached to the left and right bed walls 26, 30. In one alternative configuration, not shown, the tailgate panel 46 can be attached to the bed floor 38 with hinges.

In the closed position (FIG. 1), the tailgate panel 46 is generally perpendicular to the bed floor 38 and covers or blocks the space laterally between the rear ends of the left and right bed walls 26, 30 to close the rear of the cargo bed 42. In the closed position (FIG. 1), the rearward side 82 of the tailgate panel 46 is generally aligned with the rearward ends of the left and right bed walls 26, 30. In the open position (FIG. 2), the tailgate panel 46 is generally parallel to the bed floor 38 and does not block the space laterally between the rear ends of the left and right bed walls 26, 30, so that the cargo bed 42 is open from the rear of the vehicle 10. In the example provided, the cargo side 78 of the tailgate panel 46 is generally aligned with the bed floor 38 when the tailgate panel 46 is in the open position (FIG. 2).

The left tailgate latch 50 is attached to the left portion 66 proximate to a top left corner of the tailgate panel 46. In the example provided, the left tailgate latch 50 is mounted to the left side 86 of the tailgate panel 46. The right tailgate latch 54 is attached to the right portion 70 proximate to a top right corner of the tailgate panel 46. In the example provided, the right tailgate latch 54 is mounted to the right side 90 of the tailgate panel 46. The left and right tailgate latches 50, 54 are configured to detachably couple the top of the tailgate panel 46 to the left and right bed walls 26, 30, respectively, to hold the tailgate panel 46 in the closed position (FIG. 1). The tailgate 22 can also include a lever or handle (not shown) that can be mechanically or electrically coupled to the left and right tailgate latches 50, 54 to allow a user to selectively disengage the left and right tailgate latches 50, 54 from the left and right bed walls 26, 30, allowing the tailgate panel 46 to move to the open position (FIG. 2).

Figure 3:
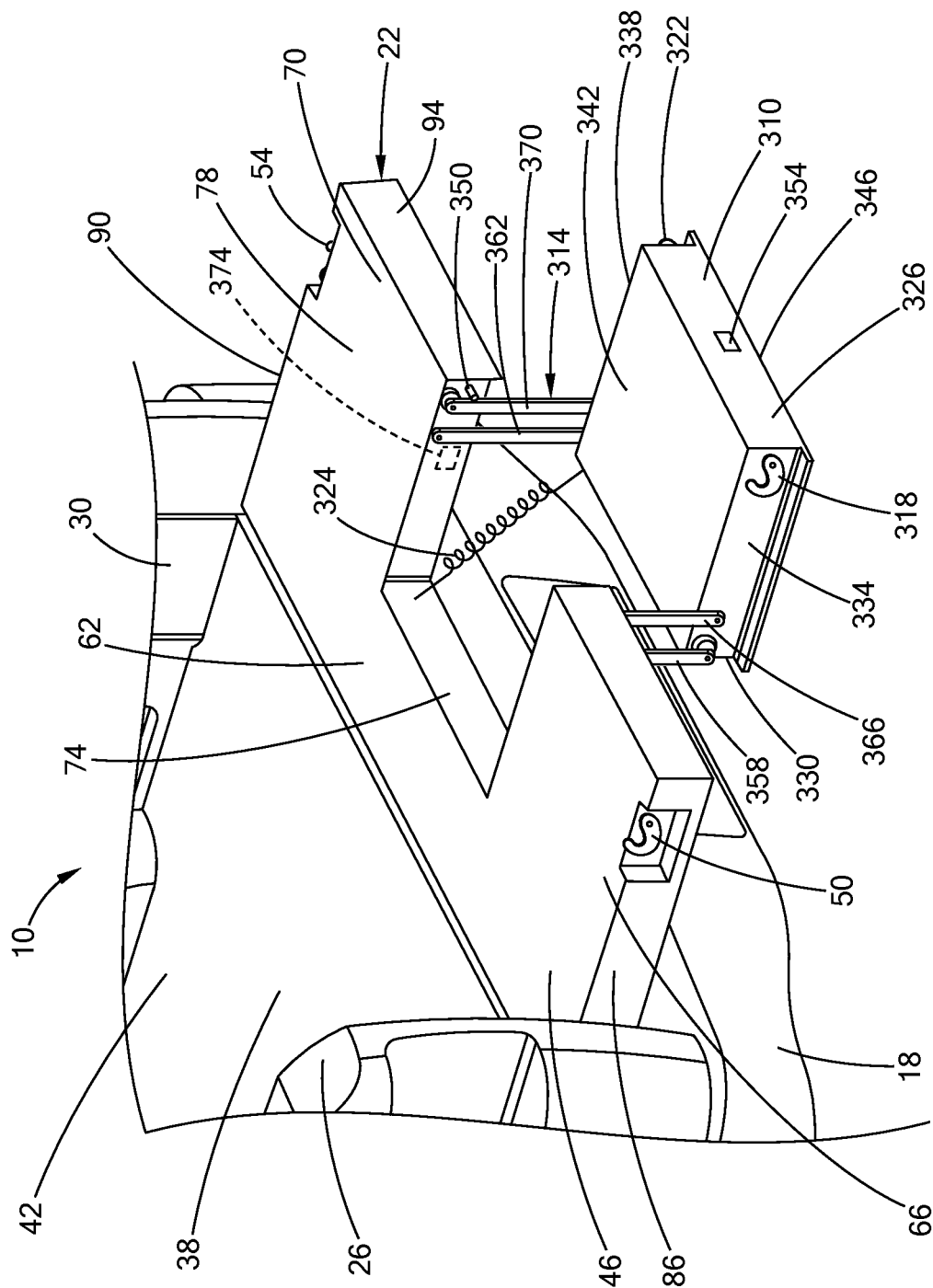
FIG. 3 is a perspective view similar to FIG. 2, illustrating the step in a deployed position.

With additional reference to FIG. 3, the step assembly 58 includes a step panel 310, a linkage 314, a left step latch 318, and a right step latch 322. The linkage 314 generally couples the step panel 310 to the tailgate panel 46. In the example provided, the step assembly 58 also includes one or more biasing members 324. The linkage 314 is configured to permit the step panel 310 to move relative to the tailgate panel 46 between a stowed position (shown in FIGS. 1 and 2) and a deployed position (shown in FIG. 3). The step panel 310 has a shape that is complementary to the step cavity 74 so that the step panel 310 is matingly received in the step cavity 74. In the example provided, the step cavity 74 and the step panel 310 have complementary square or rectangular shapes, though other shapes can be used.

The step panel 310 has a top side 326, a bottom side 330, a left side 334, a right side 338, a cargo side 342 and a rearward side 346. When the step panel 310 is in the stowed position (FIG. 2), the top side 326 is generally aligned with the top side 94 of the tailgate panel 46, the bottom side 330 opposes the top of the bottom portion 62, the left side 334 opposes the right side of the left portion 66, and the right side 338 opposes the left side of the right portion 70. When in the stowed position (FIG. 2), the cargo side 342 is generally aligned with the cargo side 78 of the tailgate panel 46 and the rearward side 346 is generally aligned with the rearward side 82 of the tailgate panel 46.

The left step latch 318 is configured to releasably connect the left side 334 to the left portion 66 and the right step latch 322 is configured to releasably connect the right side 338 to the right portion 70. In the example provided, the right step latch 322 is mounted to a top of the right side 338 and is configured to engage a latch target 350 that is fixedly mounted to the right portion 70. In the example provided, the left step latch 318 is mounted to a top of the left side 334 and is configured to engage a latch target (not shown, but can be similar to latch target 350) that is fixedly mounted to the left portion 66. The left and right step latches 318, 322 can be mechanically or electrically released by actuation of a lever or button 354.

The linkage 314 couples the step panel 310 to the left and right portions 66, 70 and is configured to permit the step panel 310 to move relative to the tailgate panel 46 between the stowed position (FIG. 2) and the deployed position (FIG. 3). In the example provided, the linkage 314 is four-bar linkage type of mechanism including a left first link 358, a right first link 362, a left second link 366, and a right second link 370, with the tailgate panel 46 making up the third link and the step panel 310 making up the fourth link of the four-bar linkage mechanism. The linkage 314 can also include a position lock 374.

The left first link 358 is a rigid member with a proximal end pivotably coupled to the right side of the left portion 66 and a distal end pivotably coupled to the left side 334 of the step panel 310. The left second link 366 is a rigid member with a proximal end pivotably coupled to the right side of the left portion 66 at a different location than the left first link 358. The left second link 366 has a distal end that is pivotably coupled to the left side 334 of the step panel 310 at a location that is different than the left first link 358.

The right first link 362 is similar to the left first link 358, but with the proximal end pivotably coupled to the left side of the right portion 70 and the distal end pivotably coupled to the right side 338 of the step panel 310. The right second link 370 is similar to the left second link 366, but with the proximal end pivotably coupled to the left side of the right portion 70 and the distal end pivotably coupled to the right side 338 of the step panel 310. In the example provided, the proximal and distal ends of the links 358, 362, 366, 370 pivot about axes that are parallel to each other and extend in the lateral direction of the vehicle 10. In the example provided, the proximal ends of the first links 358, 362 are closer to the bottom portion 62 than the proximal ends of the second links 366, 370, and the proximal ends of the links 358, 362, 366, 370 are closer to the top side of the tailgate panel 46 than they are to the bottom portion 62. In the example provided, the distal ends of the first links 358, 362 are closer to the bottom side 330 of the step panel 310 than the distal ends of the second links 366, 370 and the distal ends of the links 358, 362, 366, 370 are closer to the bottom side 330 of the step panel 310 than they are to the top side 326. In the example provided, the links 358, 362, 366, 370 have the same length. In the example provided, the links 358, 362, 366, 370 are vertical with the ground and generally perpendicular to the tailgate panel 46 and the step panel 310 when in the deployed position.

The linkage 314 is configured to maintain the step panel 310 in an orientation that is parallel to the tailgate panel 46 while in the stowed position (FIG. 2), the deployed position (FIG. 3), and while moved between the stowed and deployed positions. When the tailgate panel 46 is in the open position and the step panel 310 is in the deployed position (as shown in FIG. 3), the cargo side 342 of the step panel 310 is below the tailgate panel 46. In this position, the top side 326 of the step panel 310 is also rearward of the top side of the tailgate panel 46. The linkage 314 is constructed of a material that is strong enough to support a person carrying cargo while in the deployed position.

The position lock 374 is configured to lock the linkage in the deployed position (FIG. 3). The position lock 374 can be located on the tailgate panel 46 as shown in dashed lines and can engage one or more of the links 358, 362, 366, 370 and can prevent movement of the links 358, 362, 366, 370 when engaged. In an alternative configuration, not shown, the position lock 374 can be located on the step panel 310 to engage one or more of the links 358, 362, 366, 370. The position lock 374 can be configured to automatically engage when the step panel 310 reaches the deployed position and can be disengaged by a button or lever. In one configuration, the same button or lever (e.g., button 354) used to disengage the step latches 318, 322 can be used to disengage the position lock 374. In another configuration, the a different button or lever (not shown) can be used.

The biasing member 324 can be any suitable type of resilient member configured to bias the step member toward either the stowed position (FIGS. 1 and 2) or the deployed position (FIG. 3). In the example provided, the biasing member 324 is a spring with one end attached to the tailgate panel 46 and the other end attached to the step panel 310 and is configured to bias the step panel 310 toward the stowed position. In an alternative configuration, not specifically shown, one or more torsion springs can be disposed within the tailgate panel 46 and/or the step panel 310 and configured to rotationally bias the links 358, 362, 366, 370 toward either the stowed or deployed position.

Figure 4:
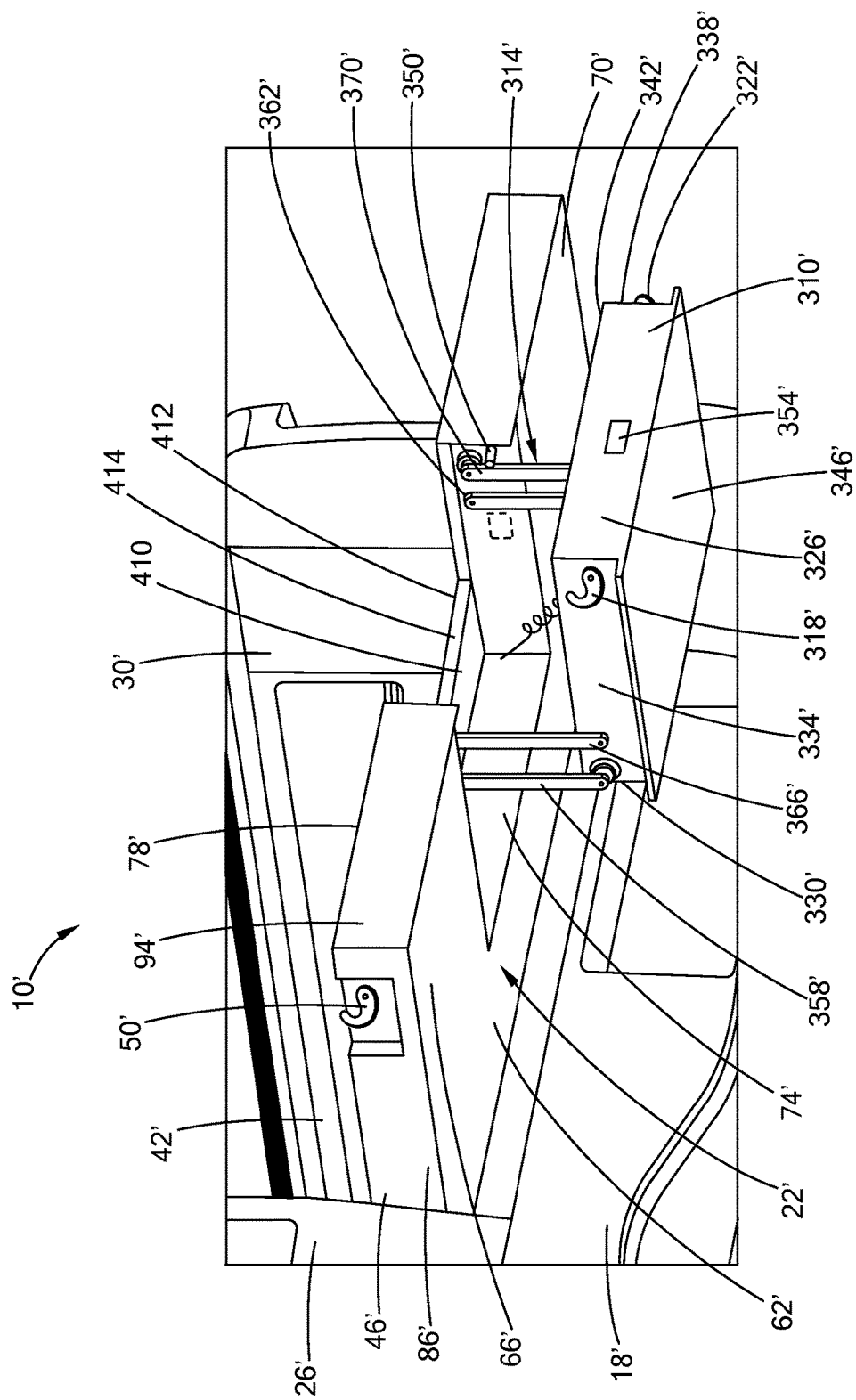
FIG. 4 is a perspective view of a tailgate of a second construction in accordance with the teachings of the present disclosure.

With additional reference to FIG. 4, a vehicle 10' of a second construction is illustrated. The vehicle 10' is similar to the vehicle 10 (FIGS. 1-3) except as otherwise shown or described herein. Features of the vehicle 10' that are similar to those of the vehicle 10 (FIGS. 1-3) are denoted with similar, but primed reference numerals and only differences are described in detail herein. In the example provided, the tailgate panel 46' includes a cover member 410. The cover member 410 is generally flat and flush with the cargo side 78' of the tailgate panel 46'. The cover member 410 spans laterally between the left and right portions 66', 70' and extends from the bottom portion 62' toward the top side 94' of the tailgate panel 46' a distance that is less than the full distance to the top side 94'.

The cargo side 342' of the step panel 310' can include a recess (not shown) that corresponds to the cover member 410 so that when the step panel 310' is in the stowed position (similar to FIGS. 1 and 2), the cover member 410 is nested in the recess (not shown) and the non-recessed area of the cargo side 342' of the cover member 410' is generally aligned with a cargo side 412 of the cover member 410 and the cargo side 78' of the tailgate panel 46'. In the example provided, a top end 414 of the cover member 410 is rearward of the bottom side 330' of the step panel 310' when the step panel 310' is in the deployed position (FIG. 4).

Figure 5:
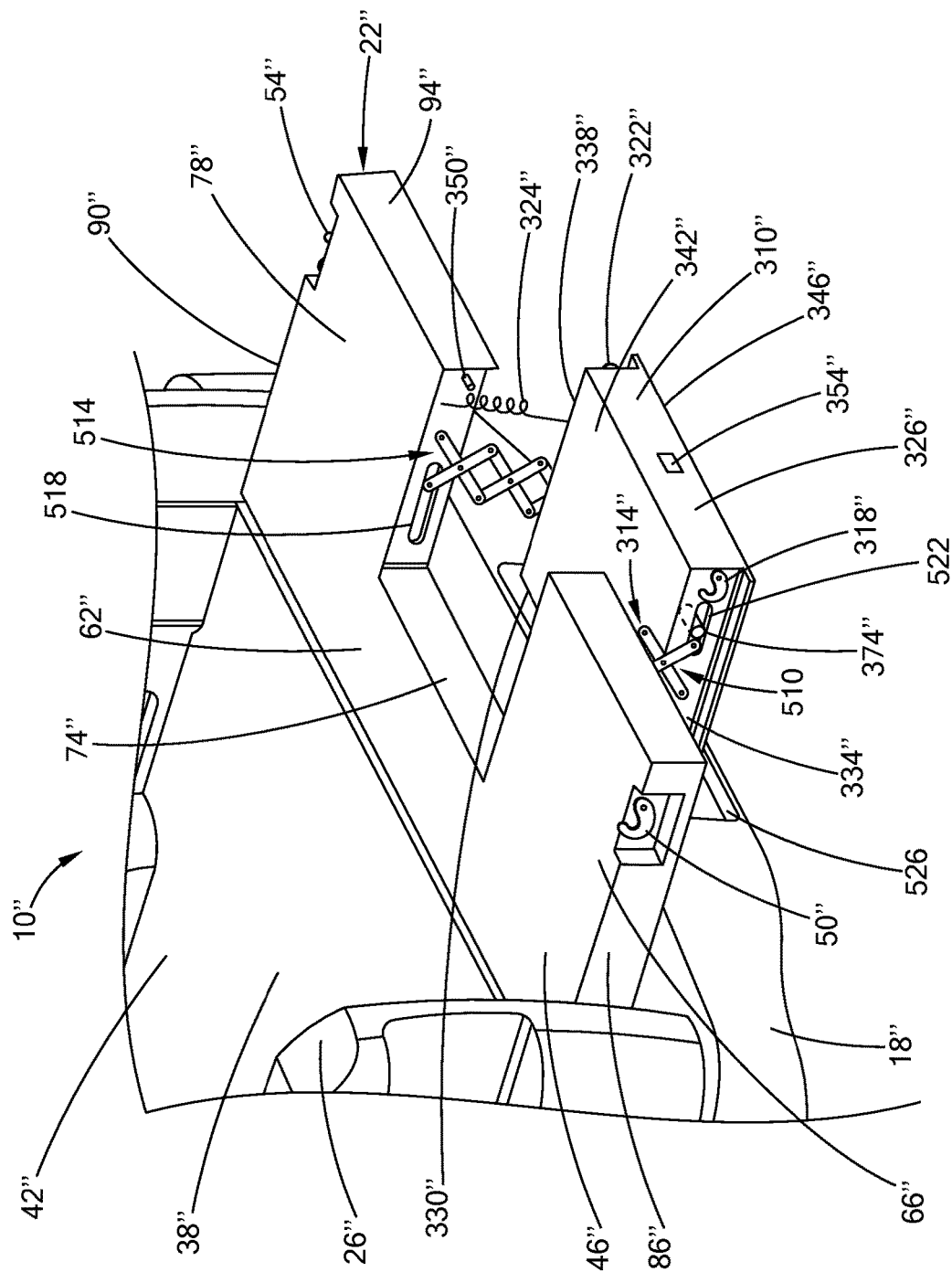
FIG. 5 is a perspective view of a tailgate of a third construction in accordance with the teachings of the present disclosure.

With additional reference to FIG. 5, a vehicle 10" of a third construction is illustrated. The vehicle 10" is similar to the vehicle 10 (FIGS. 1-3) except as otherwise shown or described herein. Features of the vehicle 10" that are similar to those of the vehicle 10 (FIGS. 1-3) are denoted with similar, but double primed reference numerals and only differences are described in detail herein. In the example provided, the linkage 314" is a scissor mechanism instead of a four-bar linkage. The linkage 314" includes a left set of scissor links 510 and a right set of scissor links 514. The left set of scissor links 510 couple the left portion 66" to the left side 334" of the step panel 310". The right set of scissor links 514 couple the right portion 70" to the right side 338" of the step panel 310".

One of the two right scissor links 514 that are directly connected to the right portion 70" has one end connected to the right portion 70" in a manner such that it pivots relative to the right portion 70" but is otherwise stationary relative to the right portion 70". The other one of the two right scissor links 514 that are directly connected to the right portion 70" has one end connected to the right portion 70" in a manner such that it pivots relative to the right portion 70" and also translates along a track 518 formed in the right portion 70". While not specifically shown in FIG. 5, the two left scissor links 510 that are directly connected to the left portion 66" are connected to the left portion 66" in a similar manner, such that one pivots, while the other pivots and translates.

Similarly, one of the two left scissor links 510 that are directly connected to the left side 334" of the step panel 310" has one end connected to the left side 334" in a manner such that it pivots relative to the left side 334" but is otherwise stationary relative to the left side 334". The other one of the two left scissor links 510 that are directly connected to the left side 334" has one end connected to the left side 334" in a manner such that it pivots relative to the left side 334" and also translates along a track 522 formed in the left side 334". While not specifically shown in FIG. 5, the two right scissor links 514 that are directly connected to the right side 338" are connected to the right side 338" in a similar manner, such that one pivots, while the other pivots and translates. Thus, the linkage 314" is configured to maintain the step panel 310" generally parallel to the tailgate panel 46" while it is moved from the stowed position to the deployed position.

In the example provided, the biasing member 324" is a spring with one end attached to the tailgate panel 46" and the other end attached to the step panel 310". In the example provided, the biasing member 324" is configured to bias the step panel 310" toward the deployed position, though other configurations can be used. In an alternative configuration, not specifically shown, the biasing member 324" can be attached to the ends of the links 510 that are disposed in the tracks 518 and/or 522 to bias that end within the track 518 and/or 522. In the example provided, the position lock 374" is disposed within the tracks 522 to inhibit sliding of the end of the links 510 of the tracks 522, though other configurations can be used, such as being configured to inhibit rotation of one or more of the links 510, 514.

In the example provided, the bumper 18" of the vehicle 10 can also optionally include a shoulder 526 that has an upward facing surface that contacts the rearward side 346 of the step panel 310" to provide additional support for the step panel 310" in the deployed position.

The description of the disclosure is merely exemplary in nature and, thus, variations that do not depart from the substance of the disclosure are intended to be within the scope of the disclosure. Such variations are not to be regarded as a departure from the spirit and scope of the disclosure.

None of the elements recited in the claims are intended to be a means-plus-function element within the meaning of 35 U.S.C. § 112(f) unless an element is expressly recited using the phrase "means for", or in the case of a method claim using the phrases "operation for" or "step for".

What is claimed is:

1. A tailgate for a vehicle, the tailgate comprising:
   a main panel including a first cargo side and a first rearward side and defining a cutout open through the first rearward side, the main panel being adapted to be mounted to a cargo area of the vehicle movable relative to the cargo area between a closed position and an open position, wherein when the main panel is in the closed position the first cargo side faces toward the cargo area and the first rearward side faces away from the cargo area;

a step including a second cargo side and a second rearward side;

a plurality of links coupling the step to the main panel and supporting the step for movement relative to the main panel between a stowed position and a deployed position, wherein when the step is in the stowed position the step is received in the cutout and the second cargo side is substantially parallel to the first cargo side, and wherein when the step is in the deployed position the step is offset from the main panel and the second cargo side is substantially parallel to the first cargo side; and a resilient member coupled to one of the step or the plurality of links and configured to bias the step toward the stowed position or the deployed position.

2. The tailgate of claim 1, wherein the plurality of links includes a first link, a second link, a third link, and a fourth link, the first and second links coupling a left side of the step to the main panel, the third and fourth links coupling a right side of the step to the main panel.

3. The tailgate of claim 2, wherein the first, second, third, and fourth links are mounted to the main panel within the cutout.

4. The tailgate of claim 3, wherein when the main panel is in the closed position and the step is in the stowed position, the first, second, third, and fourth links are mounted to the main panel proximate to a top of the main panel and mounted to the step proximate to a bottom of the step.

5. The tailgate of claim 1, wherein the cut-out is open through the first cargo side.

6. The tailgate of claim 1, wherein when the step is in the stowed position a portion of the step overlaps with a portion of the first cargo side.

7. The tailgate of claim 1, wherein when the step is in the stowed position a portion of the step overlaps with a portion of the first rearward side.

8. The tailgate of claim 1, further comprising a first latch configured to inhibit movement of the step from the stowed position to the deployed position.

9. The tailgate of claim 8, further comprising a second latch configured to inhibit movement of the step from the stowed position to the deployed position.

10. The tailgate of claim 9, wherein the first latch is located on a left side of the step and the second latch is located on a right side of the step.

11. The tailgate of claim 1, further comprising a stop member configured to engage one of the step and the plurality of links to inhibit movement of the step relative to the main panel when the step is in the deployed position.

12. The tailgate of claim 1, wherein the plurality of links are configured to move the step between the stowed position and the deployed position while maintaining the second cargo side substantially parallel to the first cargo side.

13. The tailgate of claim 1, wherein the plurality of links form a scissor mechanism.

14. A tailgate for a vehicle, the tailgate comprising:

a main panel including a first cargo side and a first rearward side and defining a cutout open through the first rearward side, the main panel being adapted to be mounted to a cargo area of the vehicle movable relative to the cargo area between a closed position and an open position, wherein when the main panel is in the closed position the first cargo side faces toward the cargo area and the first rearward side faces away from the cargo area;

a step including a second cargo side and a second rearward side; and a plurality of links including a first link, a second link, a third link, and a fourth link, the plurality of links coupling the step to the main panel and supporting the step for movement relative to the main panel between a stowed position and a deployed position, wherein when the step is in the stowed position the step is received in the cutout and the second cargo side is substantially parallel to the first cargo side, and wherein when the step is in the deployed position the step is offset from the main panel and the second cargo side is substantially parallel to the first cargo side, one end of the first link and one end of the second link mounted proximate to a left side of the step, an other end of the first link and an other end of the second link mounted to the main panel, one end of the third link and one end of the fourth link mounted proximate to a right side of the step, an other end of the third link and an other end of the fourth link mounted to the main panel.

15. The tailgate of claim 14, further comprising a stop member configured to engage one of the step and the plurality of links to inhibit movement of the step relative to the main panel when the step is in the deployed position.

16. The tailgate of claim 14, further comprising a first latch and a second latch that are configured to inhibit movement of the step from the stowed position to the deployed position, the first latch engaging the left side of the step with the main panel, the second latch engaging the right side of the step with the main panel.

17. The tailgate of claim 14, further comprising a resilient member coupled to one of the step or the plurality of links and configured to bias the step toward the stowed position or the deployed position.

18. A vehicle comprising:

a vehicle body defining a cargo area;

a tailgate panel pivotally coupled to the vehicle body for movement relative to the vehicle body between a closed position and an open position, the tailgate panel including first cargo side and a first rearward side, the tailgate panel defining a cutout open through the first rearward side, wherein when the tailgate panel is in the closed position the first cargo side faces into the cargo area and the first rearward side faces away from the cargo area;

a step including a second cargo side and a second rearward side;

a plurality of links including a first link, a second link, a third link, and a fourth link, the plurality of links coupling the step to the tailgate panel and supporting the step for movement relative to the tailgate panel between a stowed position and a deployed position, wherein when the step is in the stowed position the step is received in the cutout and the second cargo side is substantially parallel to the first cargo side, and wherein when the step is in the deployed position the step is offset from the tailgate panel and the second cargo side is substantially parallel to the first cargo side, wherein one end of the first link and one end of the second link are mounted to the step proximate to a left side of the step, and an other end of the first link and an other end of the second link are mounted to the tailgate panel, wherein one end of the third link and one end of the fourth link are mounted to the step proximate to a right side of the step, and an other end of the third link and an other end of the fourth link are mounted to the tailgate panel;

a latch operable in a first mode in which the step is movable relative to the tailgate panel and a second mode in which the latch inhibits movement of the step relative to the tailgate panel; and a stop member configured to engage one of the step and the plurality of links to inhibit movement of the step relative to the tailgate panel when the step is in the deployed position.

19. The vehicle of claim 18, further comprising a resilient member coupled to one of the step or the plurality of links and configured to bias the step toward the stowed position or the deployed position.

* * * * *